(12) United States Patent
Arham et al.

(10) Patent No.: US 12,078,570 B2
(45) Date of Patent: Sep. 3, 2024

(54) APPARATUS, KIT AND METHOD FOR SIMULATING A VEHICLE SURFACE AND MAPPING A SPRAY PATTERN OF A WATER LEAK TESTER

(71) Applicant: Honda Motor Co., Ltd., Tokyo (JP)

(72) Inventors: Muhammad Arham, Pickering (CA); Timothy Brien Sirola, Barrie (CA); Jason Travis McLeod, Markham (CA); Norbert L. Kukta, Barrie (CA)

(73) Assignee: HONDA MOTOR CO., LTD., Tokyo (JP)

( * ) Notice: Subject to any disclaimer, the term of this patent is extended or adjusted under 35 U.S.C. 154(b) by 397 days.

(21) Appl. No.: 17/559,294

(22) Filed: Dec. 22, 2021

(65) Prior Publication Data

US 2023/0194377 A1 Jun. 22, 2023

(51) Int. Cl.
| | | |
|---|---|---|
| G01F 1/76 | (2006.01) | |
| F16S 3/06 | (2006.01) | |
| G01F 3/36 | (2006.01) | |
| G01M 3/04 | (2006.01) | |
| B05B 12/08 | (2006.01) | |

(52) U.S. Cl.
CPC ............ G01M 3/04 (2013.01); F16S 3/06 (2013.01); B05B 12/084 (2013.01)

(58) Field of Classification Search
CPC .............. G01F 1/76; G01F 1/007; G01F 3/36
See application file for complete search history.

(56) References Cited

U.S. PATENT DOCUMENTS

| | | | | |
|---|---|---|---|---|
| 3,459,049 A | * | 8/1969 | Kamps ............... | F02M 65/00 |
| | | | | 73/114.46 |
| 7,469,570 B2 | * | 12/2008 | Cooper ............... | C03C 25/143 |
| | | | | 73/1.16 |
| 9,170,141 B2 | | 10/2015 | Lee et al. | |
| 2015/0153252 A1 | * | 6/2015 | Yu ..................... | A62C 99/0081 |
| | | | | 73/168 |

FOREIGN PATENT DOCUMENTS

| | | |
|---|---|---|
| CN | 202614534 U | 12/2012 |
| CN | 206990191 U | 2/2018 |
| CN | 108287077 A | 7/2018 |
| CN | 107300457 B | 1/2019 |

(Continued)

*Primary Examiner* — Jill E Culler
*Assistant Examiner* — Ruben C Parco, Jr.
(74) *Attorney, Agent, or Firm* — KENEALY VAIDYA LLP (57) ABSTRACT

A vehicle surface simulation apparatus for mapping a nozzles spray pattern of a water leak tester configured to spray water onto an exterior of a vehicle. A jig of the apparatus can be configured to simulate a plurality of exterior surface portions of two different vehicles. The jig can include at least a first area configured to represent at least a portion of a side-view profile of the first vehicle and the second vehicle, and at least a second area configured to represent at least a portion of a front-view profile of the first vehicle and at least a portion of a rear-view profile of the second vehicle. The funnel can be supported in one of the areas such that a funnel inlet lies in a plane that represents a predetermined surface of the vehicle. The conduit can be in fluid communication with the funnel and the container.

11 Claims, 9 Drawing Sheets

(56) References Cited

FOREIGN PATENT DOCUMENTS

| | | |
|---|---|---|
| DE | 102012111151 A1 | 5/2013 |
| KR | 101220563 B1 | 1/2013 |
| KR | 101258774 B1 | 4/2013 |
| WO | WO-2012057542 A2 * | 5/2012 ............... G01F 1/76 |
| WO | WO2018087626 A1 | 5/2018 |

* cited by examiner

APPARATUS, KIT AND METHOD FOR SIMULATING A VEHICLE SURFACE AND MAPPING A SPRAY PATTERN OF A WATER LEAK TESTER

BACKGROUND

The disclosed subject matter relates to evaluating performance of a water leak tester used for testing a newly assembled vehicle for water leaks. More particularly, the disclosed subject matter relates to methods and apparatus that can characterize the performance of a water leak tester.

A newly assembled vehicle can undergo a plurality of tests before it is released from the factory. For example, the vehicle can be operated on a dynamometer to verify that the performance of the engine and transmission meet the desired specifications. In another example, the vehicle can be placed in a water leak tester and tested for water leaks (water entering an interior area or compartment of the vehicle from a water source that is exterior the vehicle). The water leak tester can simulate rainfall, water sprayed by a power washer, water sprayed manually using a hose with a nozzle, and water sprayed by an automated or semi-automated car washer. The water leak tester can confirm that the weather-strips and seals on the vehicle are operating within the predetermined specification.

The water leak tester can include a chamber (also referred to as a booth) and a plurality of water nozzles in the chamber that spray water onto the vehicle. Some embodiments of the water leak tester can include a conveyor which carries the vehicle through the chamber while the nozzles spray water onto the moving vehicle. Other embodiments of the water leak tester can be configured as a static booth tester in which the vehicle remains stationary in the chamber while the nozzles spray water on the vehicle. After a predetermined time or predetermined amount of water (measured as a volume or a flow rate), the nozzles can be turned off and the vehicle is inspected for water that leaked into the passenger space and any enclosed storage space(s).

SUMMARY

Some embodiments are directed to a vehicle surface simulation apparatus for mapping a spray pattern of a plurality of water nozzles of a water leak tester configured to spray water onto an exterior of a vehicle during a water leak test. The vehicle surface simulation apparatus can include a jig, at least one funnel, at least one container and at least one conduit. The jig can have a longitudinal direction, a transverse direction and a vertical direction that are orthogonal to each other. The jig can be configured to simulate a plurality of exterior surface portions of a first vehicle and a plurality of exterior surface portions of a second vehicle that is different from the first vehicle. The jig can include at least one side area and at least a first end area. The side area can extend along the longitudinal direction. The side area can be configured to represent at least a portion of a side-view profile of each of the first vehicle and the second vehicle. The first end area can extend along the transverse direction. The first end area can be configured to represent at least a portion of a front-view profile of the first vehicle and at least a portion of a rear-view profile of the second vehicle. The funnel can include an inlet and be removably supported in one of the areas such that the inlet lies in a plane that represents a predetermined surface of the vehicle. The container can be removably supported by the jig. The conduit can be connected to and extend from the funnel to the container, and be in fluid communication with the funnel and the container.

Some embodiments are directed to a vehicle surface simulation kit for determining spray patterns for a water leak tester. The kit can include a frame assembly and a plurality of water collection assemblies. The frame assembly can include a plurality of adjustable collection locations spaced along the frame assembly, Each of the water collection assemblies can includes an inlet and a receptacle in fluid communication with the inlet. Each of the water collection assemblies can be configured to be selectively secured to any of the adjustable collection locations such that each of the inlets lies in a plane that represents a corresponding surface area of the vehicle.

Some embodiments are directed to a method for simulating a vehicle surface and determining a spray pattern for a water leak tester. The water leak tester can include a chamber and a plurality of water nozzles. The chamber can be configured to receive a vehicle. The plurality of water nozzles can be arrayed along the chamber and configured to spray a predetermined amount of water onto an exterior of the vehicle when the vehicle is located in the chamber. The method can include: positioning a calibration jig in the chamber, the calibration jig including a frame having a plurality of frame members defining a plurality of predetermined areas; providing at least one water collection assembly having an inlet; securing the at least one water collection assembly to the frame such that the inlet is located in a first of the predetermined areas and the inlet lies in a plane that represents a predetermined first surface of the vehicle; spraying water from the water nozzles for a predetermined setting; and measuring and recording first spray data indicative of the water collected by the at least one water collection assembly in the first of the predetermined areas.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 14 is a front perspective view of the vehicle surface simulation apparatus of FIG. 12 placed in the static booth water leak tester of FIG. 1 with the water turned on.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
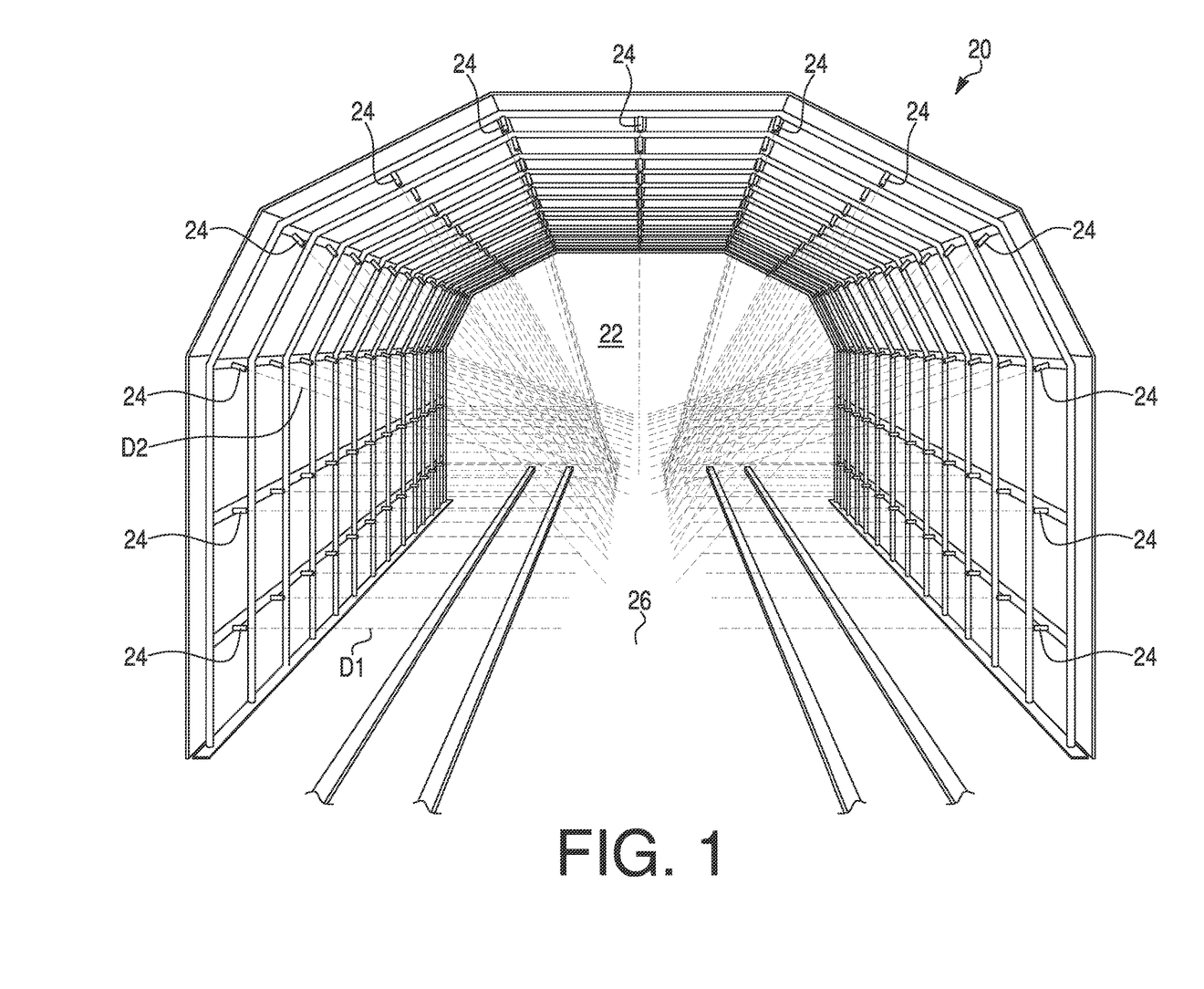
FIG. 1 is a perspective view of a static booth water leak tester.

FIG. 1 shows an exemplary water leak tester 20 configured as a static spray booth. The water leak tester 20 can include a chamber 22 and a plurality of nozzles 24 arrayed around the perimeter of the chamber 22. Each of the nozzles 24 can be configured to spray water into the chamber 22 in a predetermined pattern such as but not limited to a spray cone centered about an axis of the spray axis the nozzle 24 such as but not limited to the axes D1 or D2 indicated in phantom for two of the nozzles 24. Each spray cone can have a unique size and/or shape. Alternate embodiments of the water leak tester 20 can include two or more nozzles 24 that are configured to spray water in a cone that is the same size and/or shape.

The water leak tester 20 can undergo confirmation testing to determine whether the water leak tester 20 is directing an appropriate amount of water (measured by a volume or a flow rate) onto the exterior surface of the vehicle being tested. In an exemplary confirmation test, a plurality of buckets can be placed in the chamber 22 of the water leak tester 20 and arranged to collect the water sprayed by all of the nozzles 24. The volume of water collected in each bucket can be measured and recorded to obtain an approximation of the water sprayed onto a vehicle in the chamber 22.

However, the bucket test method can yield inconsistent results. For example, the amount of water collected by the buckets can vary as a function of the elevation of each bucket with respect to the floor 26 of the chamber 22. Further, the bucket test method can verify vertical spray patterns that simulate rainfall, but can be ineffective to verify non-vertical spray patterns such as those used to wash the sides of the vehicle. Another disadvantage of the bucket test method is that a map of the water distribution across the exterior surface of the vehicle cannot be produced from the volume of water collected in the buckets. Further still, the bucket test method can be incompatible with a water leak tester 20 that carries the vehicle through the chamber 22 on a conveyor.

Figure 2:
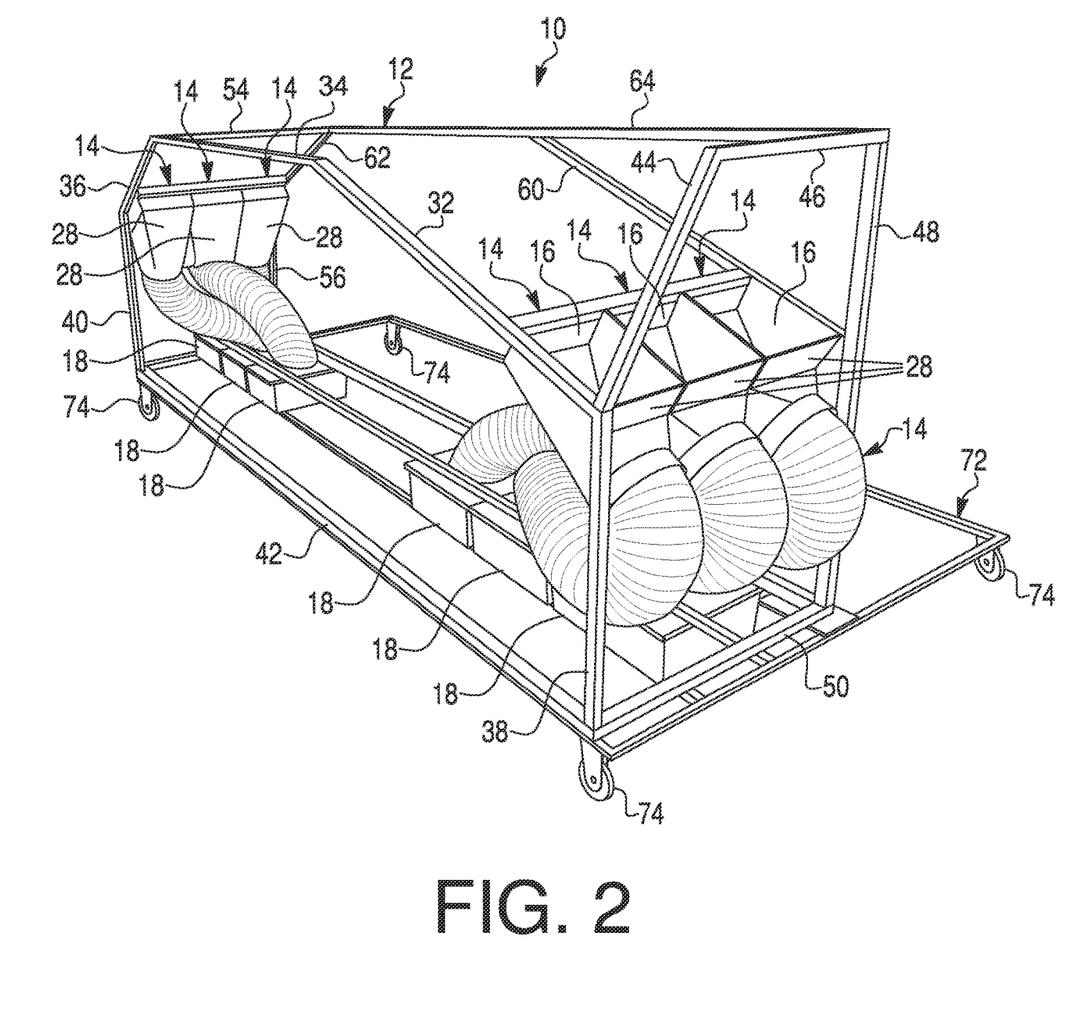
FIG. 2 is a perspective view of a vehicle surface simulation apparatus made in accordance with principles of the disclosed subject matter and can be used to measure the performance of the water leak tester of FIG. 1.

FIG. 2 illustrates an embodiment of a vehicle surface simulation apparatus 10 (also referred to as a vehicle surface patternator) made in accordance with principles of the disclosed subject matter. The vehicle surface simulation apparatus 10 can provide consistent confirmation testing of a water leak tester, provide data for creating an accurate map of the water distribution across the entirety of the vehicle exterior, and be compatible with a static booth water leak tester and a water leak tester that includes a conveyor for the vehicle.

Figure 3:
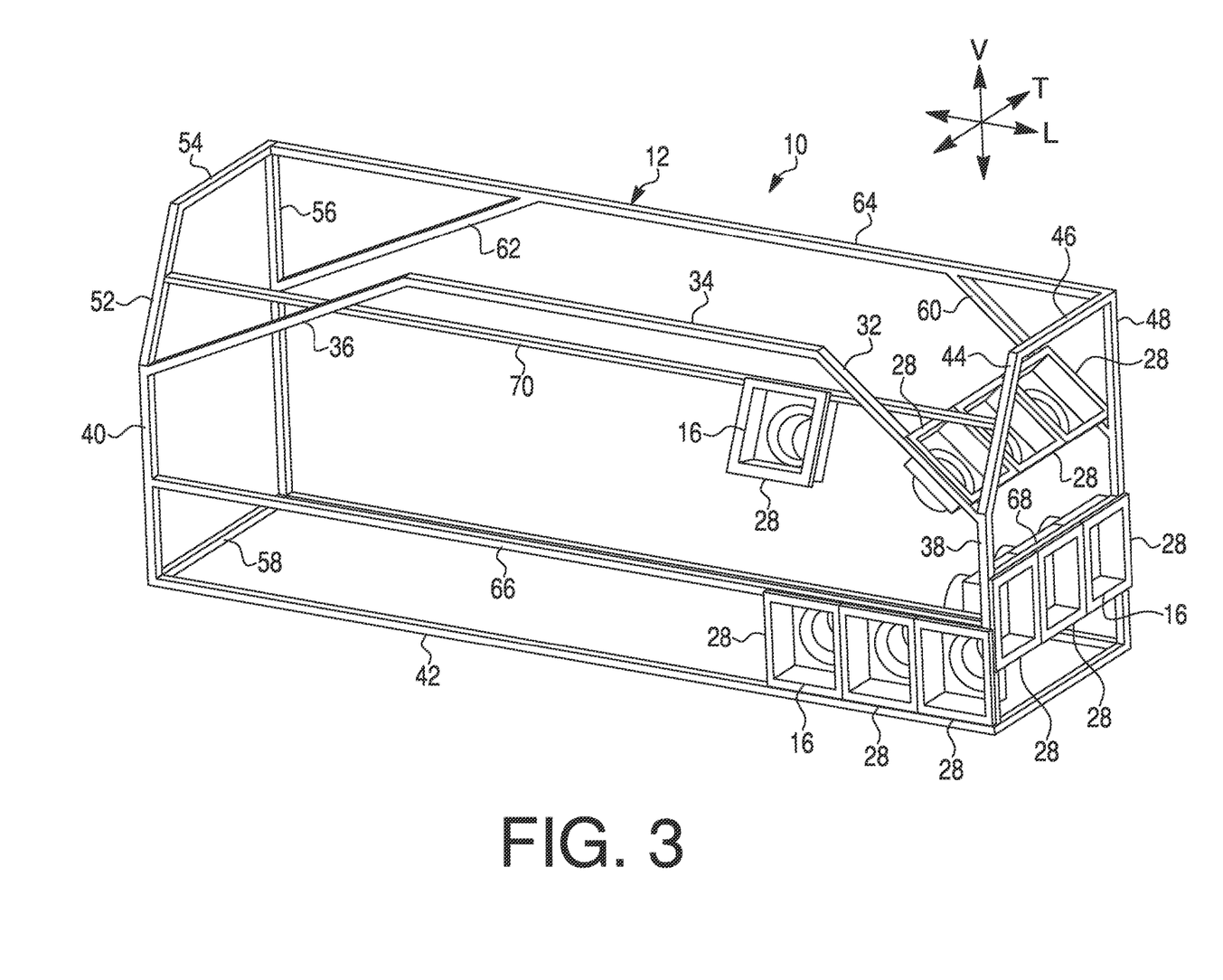
FIG. 3 is a perspective of the vehicle surface simulation apparatus of FIG. 2 in a second configuration and with portions of the water collection assemblies removed for simplicity and clarity of the drawing.
Figure 4:
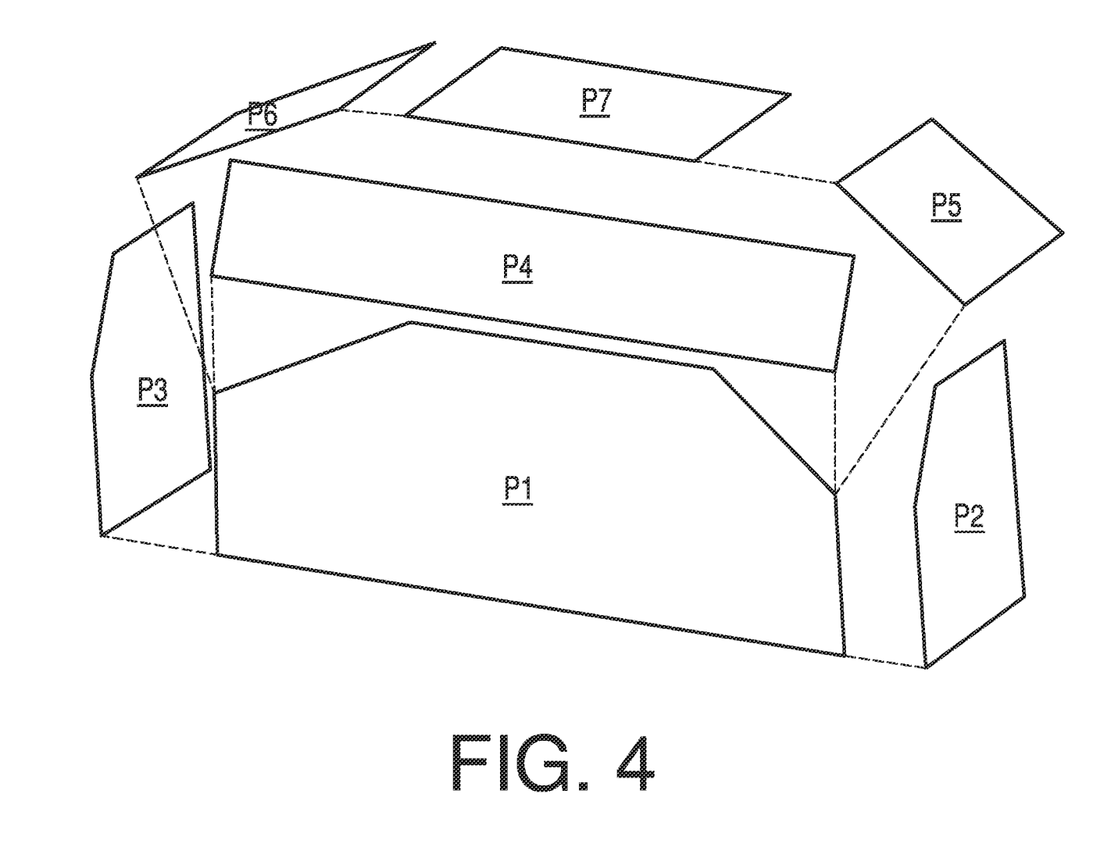
FIG. 4 is an exploded perspective view of a plurality of planar areas framed by a jig of the vehicle surface simulation apparatus of FIG. 2.
Figure 5:
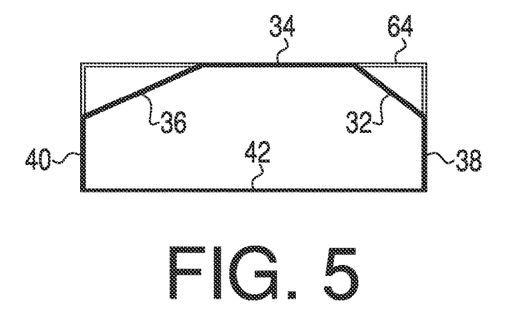
FIG. 5 is a side view of a jig of the vehicle surface simulation apparatus of FIG. 2.
Figure 6:
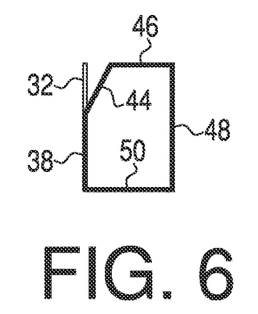
FIG. 6 is an end view of the jig of the vehicle surface simulation apparatus of FIG. 2.
Figure 7:
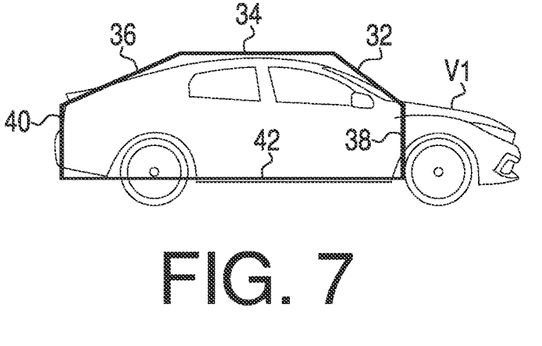
FIG. 7 is a side view of the jig of FIG. 5 superimposed on the right side of a first vehicle.
Figure 8:
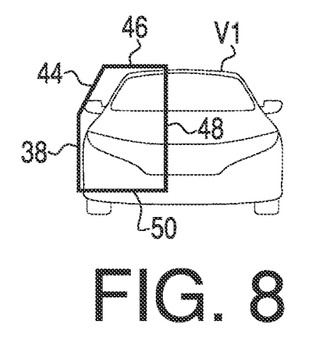
FIG. 8 is an end view of the jig of FIG. 6 superimposed on the front end of the first vehicle of FIG. 7.
Figure 9:
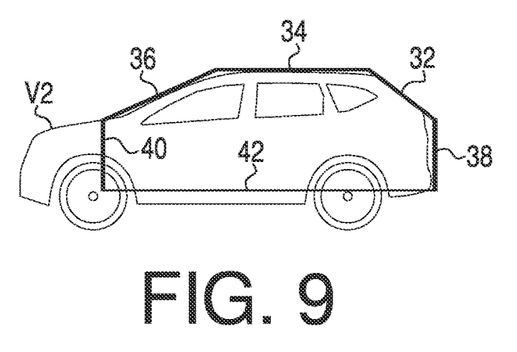
FIG. 9 is a side view of the jig of FIG. 5 superimposed on the left side of a second vehicle.
Figure 10:
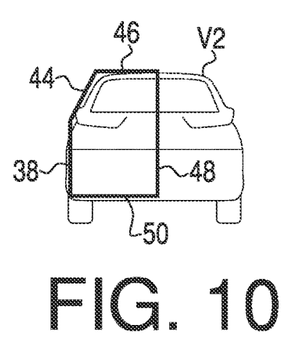
FIG. 10 is an end view of the jig of FIG. 6 superimposed on the rear end of the second vehicle of FIG. 9.

Referring to FIGS. 3 and 4, the vehicle surface simulation apparatus 10 can include a jig 12 that frames one or more flat, planar areas P1, P2, P3, P4, P5, P6, P7 that represent a three-dimensional side-view profile of a vehicle exterior surface and one or more flat planar areas that represent a three-dimensional front-view profile of the vehicle exterior surface. The data associated with the planar areas P1, P2, P3, P4, P5, P6, P7 framed by the jig 12 can be combined to create a three-dimensional representation of the water distribution across the vehicle exterior.

Referring to FIG. 2, the vehicle surface simulation apparatus 10 can include a plurality of water collection assemblies 14. Each of the water collection assemblies 14 can include an inlet 16, a receptacle 18, a funnel 28 and a conduit 30. The inlet 16 can be in fluid communication with the receptacle 18. The receptacle 18 can be configured to collect and contain water that enters only through the inlet 16.

Figure 12:
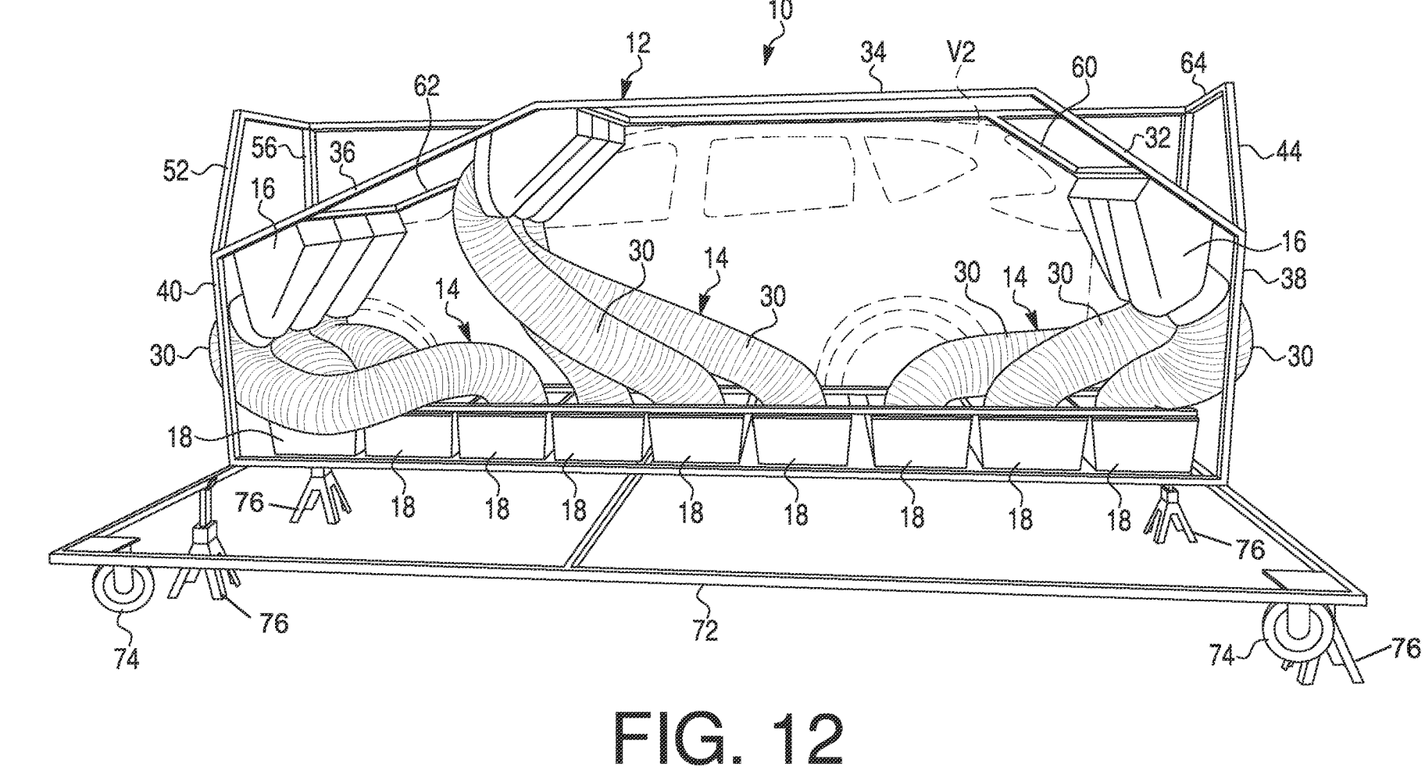
FIG. 12 is a side view of the vehicle surface simulation apparatus of FIG. 2 in a third configuration and superimposed on the left side of the second vehicle of FIG. 9.
Figure 13:
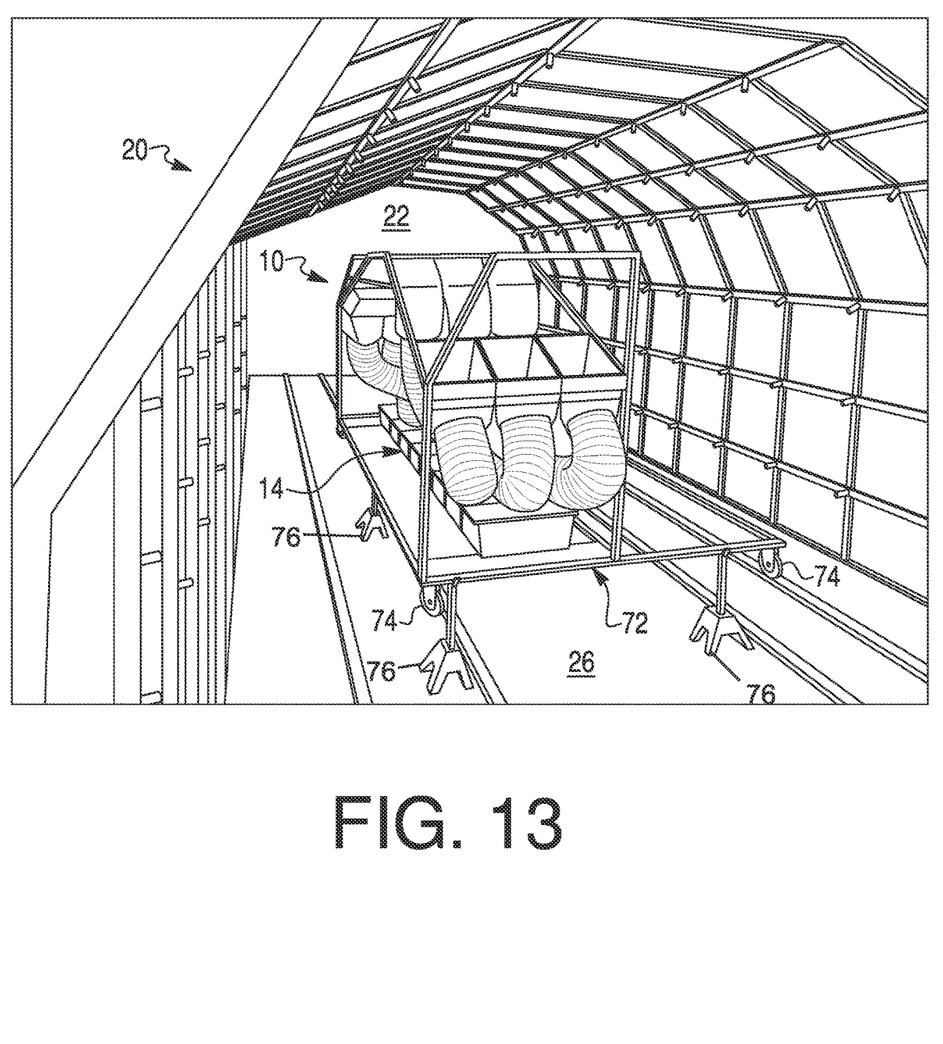
FIG. 13 is a perspective view of the vehicle surface simulation apparatus of FIG. 12 placed in the static booth water leak tester of FIG. 1 with the water turned off.
Figure 14:
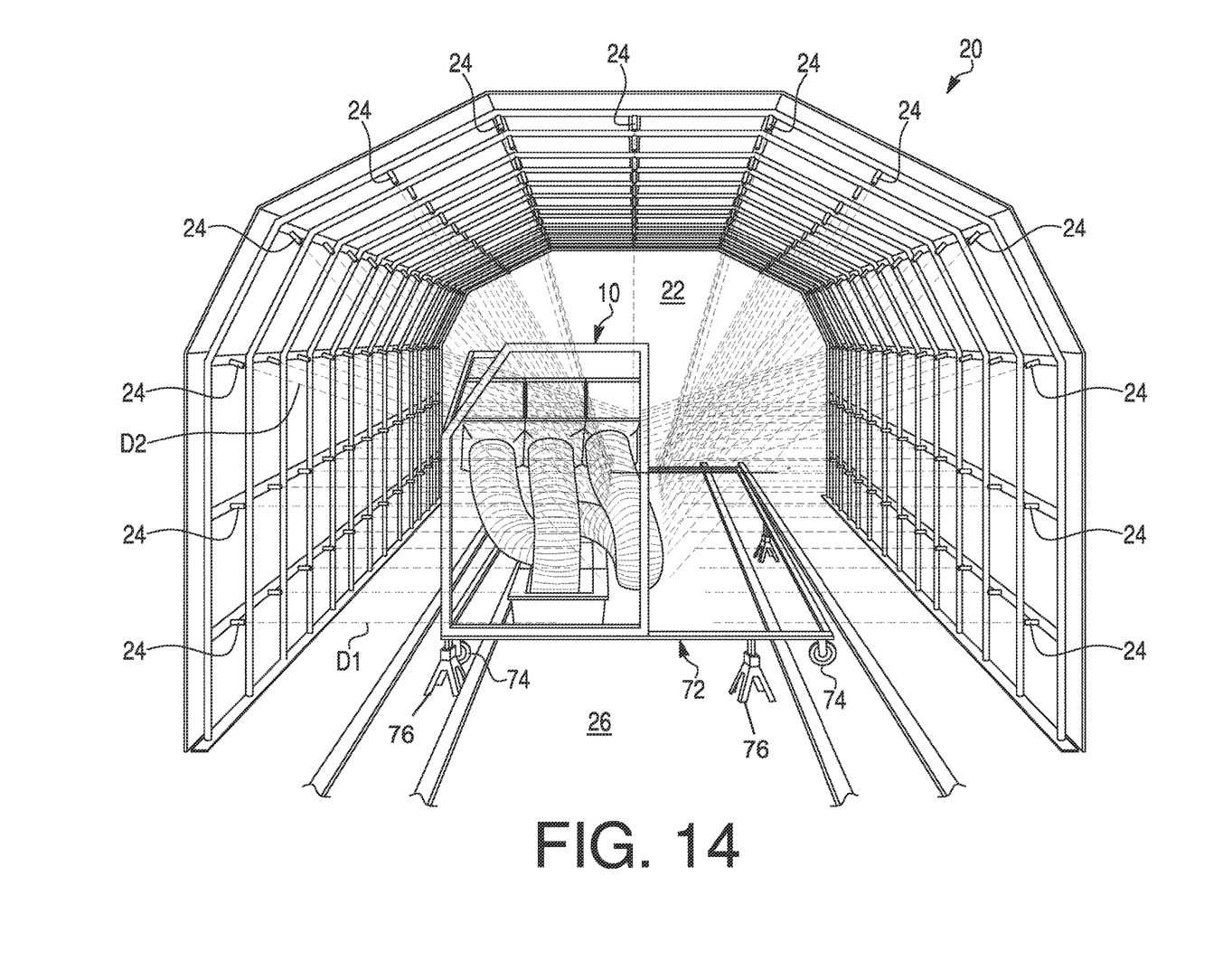

The water collection assemblies 14 can be secured to the jig 12 such that the inlets 16 lie in the planar areas P1, P2, P3, P4, P5, P6, P7 framed by the jig 12. The inlets 16 can be arrayed on the jig 12 in a predetermined pattern that represents a predetermined portion of the vehicle exterior surface. The water collection assemblies 14 can collect the fluid sprayed onto the planar areas P1, P2, P3, P4, P5, P6, P7 for volume measurement and spray pattern analysis. FIG. 2 shows the water collection assemblies 14 arranged on the jig 12 in a first configuration. FIG. 3 shows the funnel 28 of the water collection assemblies 14 arranged on the jig 12 in a second configuration, with the receptacles 18 and conduit 30 omitted from FIG. 3 for clarity and simplicity of the drawing. FIGS. 12-14 show the water collection assemblies 14 arranged in a third configuration.

The vehicle surface simulation apparatus 10 can be located in the chamber 22. Water from the nozzles 24 can enter one or more of the inlets 16 and flow into a respective one of the receptacles 18. Each of the receptacles 18 is closed to water that does not enter the respective inlet 16 so that only nozzles 24 that spray water onto the inlet 16 in fluid communication with the respective receptacle 18 is collected by the receptacle 18. Thus, each receptacle 18 can contain water that would be sprayed onto a predetermined corresponding portion of the vehicle exterior, and the volume of water in each receptacle can accurately represent the volume of water that is sprayed onto a predetermined portion of the vehicle exterior. An accurate water distribution map can be created from the measured volumes and further analyzed to determine whether it is advantageous to adjust the cone size and/or directionality for one or more of the nozzles 24.

As will be described in further detail below, the vehicle surface simulation apparatus 10 can be configured to locate each of the inlets 16 in the chamber 22 at a height that corresponds to the height of a predetermined portion of the vehicle positioned in the chamber 22. Further, each inlet 16 can be oriented in a plane that simulates the corresponding orientation of a predetermined portion of the vehicle exterior. As described above, the receptacles 18 can be sealed from water sprayed by nozzles 24 that are not directed at the respective inlet 16. Thus, the vehicle surface simulation apparatus 10 can avoid inconsistencies caused by the relative orientation of the inlets 16 with respect to the nozzles 24 and/or variations in height of the receptacles 18.

Each water collection assembly 14 can have any appropriate structure that provides a desired orientation of the inlet 16 and prevents water from entering the receptacle 18 without passing though the inlet 16. For example, the receptacle 18 and the inlet 16 can be formed by a common structure such that a single, unitary structure includes the inlet 16 and the receptacle 18. However, this exemplary embodiment can limit the flexibility of the vehicle surface simulation apparatus 10 to adapt to a vehicle having different exterior shapes and exterior dimensions. Thus, alternate embodiments can include an inlet 16 that is spaced away from the receptacle 18 and movable with respect to the receptacle 18 both in linear distance and relative orientation of the plane of the inlet 16.

Referring to FIG. 2, each water collection assembly 14 can include the funnel 28 and the conduit 30 so that the vehicle surface simulation apparatus 10 is adaptable to vehicles of different exterior shapes and exterior dimensions. The funnel 28 can include the inlet 16 at a first end. The conduit 30 can be connected to a second end of the funnel 28. The conduit 30 can be in fluid communication with the inlet 16 and the receptacle 18 and can separate the inlet 16 from the receptacle 18. The conduit 30 can be configured as a flexible corrugated hose or pipe to facilitate the movement of the inlet 16 with respect to the receptacle 18.

Referring to FIGS. 5-10, the vehicle surface simulation apparatus 10 can be configured to simulate the exterior surface of a first vehicle V1 and the exterior surface of a second vehicle V2 that is different from the exterior surface of the first vehicle V1. For example, the vehicle surface simulation apparatus 10 can be configured to simulate the exterior surfaces of the vehicle that enclose the passenger space and storage space such as but not limited to a rear cargo area that is located within the passenger space or external to the passenger space such as in a trunk.

Typically, the engine room (also referred to as an engine compartment) is not sealed from water. Thus, the jig 12 can be configured such that the hood and front end of the vehicles V1, V2 are omitted from the vehicle surface simulation apparatus 10. Of course, if desired for a certain application the jig can include surfaces that simulate the hood and front end of the vehicle. Further, the vehicles V1, V2 can be symmetric about a longitudinal centerline. Thus, the jig 12 can be configured to simulate a right half of the vehicles V1, V2 or a left half of the vehicles V1, V2. Simulating a symmetric half of the vehicle exterior surface can advantageously affect the size, weight and/or cost of the jig 12, and can avoid a complex arrangement of the jig 12 and the water collection assemblies 14.

Referring to FIG. 4, the planar areas P1, P2, P3, P4, P5, P6, P7 can represent a plurality of exterior surface portions of the first vehicle V1 and the second vehicle V2 of FIGS. 7-10. For example, the first planar area P1 can represent a right side-view silhouette (also referred to as a right side-view profile) of the first vehicle V1 and a left side-view silhouette (also referred to as a left side-view profile) of the second vehicle V2. The second planar area P2 can represent either a front-view silhouette (also referred to as a front-view profile) of the first vehicle V1 or a rear-view silhouette (also referred to as a rear-view profile) of the second vehicle V2. The third planar area P3 can represent the rear-view silhouette of the first vehicle V1 and the front-view silhouette of the second vehicle V2. The fourth planar area P4 can represent a side-view silhouette of an upper portion of the side of the first vehicle V1 and the second vehicle V2. The fifth planar area P5 can represent the front windshield of the first vehicle V1 and a rear window of the second vehicle V2. The sixth planar area P6 can represent the rear window of the first vehicle V1 and the front windshield of the second vehicle V2. The seventh planar area P7 can represent the roof of both the first vehicle V1 and the second vehicle V2. Since the front-view silhouette and the rear-view silhouette of the vehicles V1, V2 can be symmetric about the longitudinal axis of the vehicles V1, V2, the second through seventh planar areas P2, P3, P4, P5, P6, P7 can represent one half of the corresponding exterior surface of the vehicles V1, V2.

Referring to FIGS. 2, 3 and 12, the water collection assemblies 14 can be removably secured to the jig 12 and arranged on different portions of the jig 12 in one or more of the planar areas P1, P2, P3, P4, P5, P6, P7. The water collection assemblies 14 can be secured to the jig 12 as individual units or be grouped into sets of three which are movable as a single unit. Alternate embodiments can include any appropriate number of water collection assemblies in each group.

The total number of water collection assemblies 14 can be equal to or less than the number ("the fill number") required to fill all of the planar areas P1, P2, P3, P4, P5, P6, P7 at the same time. If the total number is less than the fill number, then the cost of the vehicle surface simulation apparatus 10 can be reduced. Further, using a total number that is less than fill number can provide a spacing between the jig 12, the conduits 30 and the receptacles 18 that is sufficient to facilitate access to each receptacle 18 with little or no interference from adjacent water collection assemblies 14 and the jig 12, and to permit removal of each receptacle 18 without accidental spilling of the water collected from the water leak tester 20. Further still, using a total number of water collection assemblies 14 that is less than the fill number can accommodate a diameter of the conduit 30 that provides a flow rate through the conduit 30 that is less than the flow rate of water that enters the inlet 16. Thus, water that is directed at each inlet 16 can be collected in the respective receptacle 18. However, a total number that is less than the fill number can increase the testing time because the water leak tester 20 can be subjected to a plurality of cycles in order to collect water across each of the planar areas P1, P2, P3, P4, P5, P6, P7.

Figure 11:
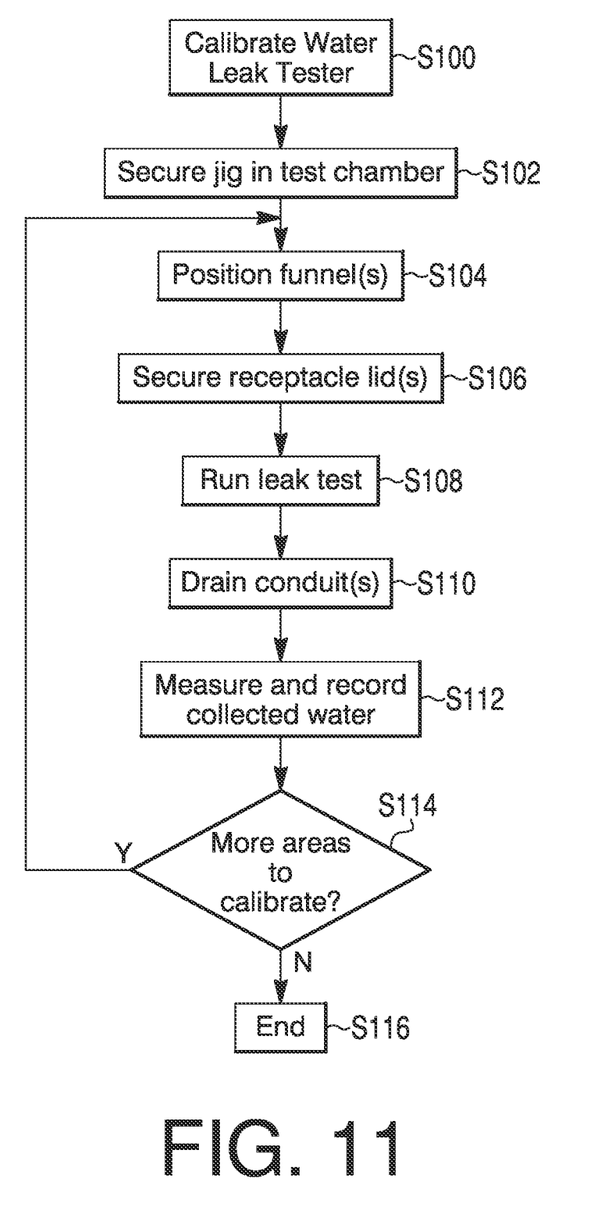
FIG. 11 is a flowchart depicting an exemplary method for using the vehicle surface simulation apparatus of FIG. 2.

FIG. 11 shows an exemplary process for creating a water distribution map by using a total number of water collection assemblies 14 that is less than the fill number. An operator can begin the process at step S100. At step S102, the operator can secure the jig 12 in the chamber 22 of the water leak tester 20 that corresponds to the location where the vehicle would be during the water leak test.

At step S104, the operator can removably secure a predetermined number of funnels 28 on the jig 12 in one or more of the planar areas P1, P2, P3, P4, P5, P6, P7. The funnels 28 can be removably secured to the jig 12 in any appropriate manner such as but not limited to threaded fasteners, clamps, hooks or any combination thereof. The funnel(s) 28 can cover any appropriate portion of any of the areas P1, P2, P3, P4, P5, P6, P7. After the predetermined number of funnels 28 have been secured to the jig 12, the operator can proceed to step S106.

At step S106, the operator can secure the receptacles 18 on the jig 12 at any appropriate location and confirm that the receptacles 18 are closed to any water that does not enter the respective inlet 16. FIG. 13 shows the vehicle surface simulation apparatus 10 positioned in the chamber 22 of the water leak tester 20 with the water collection assemblies arranged in the third configuration shown in FIG. 12. After the receptacles 18 are secured on the jig 12, the operator can proceed to step S108.

At step S108, the operator can activate the water leak tester 20 to perform a full cycle of the water leak test in accordance with the desired specification for the leak test. FIG. 14 shows the vehicle surface simulation apparatus 10 in the chamber 22 during the test cycle of the water leak tester 20. Once the test cycle is complete, the operator can proceed to step S110.

At step S110, the operator can check for water in each of the conduits 30 and drain any water trapped in the conduit 30 into the respective receptacle 18. After the operator checks the conduit 30 and drains the conduit 30 of any water, the operator can proceed to step S112.

At step S112, the operator can measure and record the volume of water collected by each receptacle 18 during the water leak test. After the operator has measured and recorded the volume of water collected by all of the receptacles 18, the operator can proceed to step S114.

As described above, for each cycle of the water leak test, funnel(s) 28 can be omitted from one or more of the planar areas P1, P2, P3, P4, P5, P6, P7 or a portion of any of the planar areas P1, P2, P3, P4, P5, P6, P7. At step S114, the operator can determine whether another of the planar areas or a different portion of one of the planar areas is to be calibrated P1, P2, P3, P4, P5, P6, P7. If not, the operator can return to step S104 and proceed as described above until water has been collected from all of the desired portions of the planar areas P1, P2, P3, P4, P5, P6, P7. If water has been collected from all of the desired portions of the planar areas P1, P2, P3, P4, P5, P6, P7, the operator has completed the water collection for the desired one of the vehicles V1, V2 and can proceed to step S116 and end the water collection phase of the confirmation test.

After completing the water collection phase of the confirmation test, the operator can review and analyze the recorded volumes of water by creating a water distribution map that shows the volume of water collected at each location of the funnels along the planar areas P1, P2, P3, P4, P5, P6, P7. The operator can compare the water distribution map to the actual water leak test results for each vehicle V1, V2 and can then determine whether the design of the weatherstrips and seals of the vehicles V1, V2 can be advantageously revised and/or whether the directionality and flow rate of the nozzles 124 of the water leak tester 20 can be adjusted to more closely represent water exposure for an actual one of the vehicle V1, V2.

Referring to FIG. 3, the jig 12 can include a longitudinal direction L, a transverse direction T and a vertical direction V that are aligned with a longitudinal direction, a transverse direction and a vertical direction for each of the vehicles V1, V2.

Referring to FIGS. 2-4 collectively, the jig 12 can include a plurality of frame members 32, 34, 36, 38, 40, 42, 44, 46, 48, 50, 52, 54, 56, 58, 60, 62 that frame the plurality of planar areas P1, P2, P3, P4, P5, P6, P7. The frame members 32, 34, 36, 38, 40, 42, 44, 46, 48, 50, 52, 54, 56, 58, 60, 62 can be connected to each other in any appropriate manner such as but not limited to using mechanical fasteners, welds, adhesive, or any combination thereof. The jig 12 can include a bracket at each of the joints that is connected to the adjacent ends of respective frame members 32, 34, 36, 28, 40, 42, 44, 46, 48, 50, 52, 54, 56, 58, 60, 62.

A first frame member 32, a second frame member 34, a third frame member 36, a fourth frame member 38, a fifth frame member 40 and a sixth frame member 42 can be connected to each other to frame the first planar area P1.

Referring to FIGS. 3-5, 7 and 9 collectively, the first frame member 32 and the third frame member 36 can represent a portion of a front pillar (also referred to as an A-pillar) that extends along a front windshield of the vehicles V1, V2. Alternatively, the first frame member 32 and the third frame member 36 can represent a portion of a rear pillar (also referred to as a C-pillar of a two-door vehicle or a D-pillar of a four-door vehicle) that extends along a rear window of the vehicles V1, V2. The first frame member 32 and the third frame member 36 can be referred to as pillar members.

The second frame member 34 can represent a side roof rail of the vehicles V1, V2. The second frame member 34 can be referred to as a roof member.

The fourth frame member 38 can represent a lower portion of the front pillar of the first vehicle V1 and the fifth frame member 40 can represent a lower portion of the rear pillar of the first vehicle V1. Alternatively, the fourth frame member 38 can represent a lower portion of the rear pillar of the second vehicle V2 and the fifth frame member 40 can represent a lower portion of the front pillar of the second vehicle V2. The fourth frame member 38 and the fifth frame member 40 can be referred to as pillar members.

The sixth frame member 42 can represent the bottom edge of a rocker panel that extends along the bottom of the doors of the vehicles V1, V2. The sixth frame member 42 can be referred to as a bottom member. The second frame member 34 can extend from and be connected to each of the first frame member 32 and the third frame member 36. The sixth frame member 42 can extend from and be connected to each of the fourth frame member 38 and the fifth frame member 40.

Referring to FIGS. 3, 4, 6, 8 and 10 collectively, the fourth frame member 38, a seventh frame member 44, an eighth frame member 46, a ninth frame member 48 and a tenth frame member 50 can be connected to each other to frame the second planar area P2.

The seventh frame member 44 can represent the portion of a front pillar that extends along a front windshield of the first vehicle V1 in the front-view silhouette of the first vehicles V1. Alternatively, the seventh frame member 44 can represent the portion of the rear pillar in the rear-view silhouette that extends along the rear window of the second vehicle V2. The seventh frame member 44 can be referred to as a pillar member.

The eighth frame member 46 can represent a front windshield header of the first vehicles V2. Alternatively, the eighth frame member can represent an upper portion of a rear tailgate of the second vehicle V1. The eighth frame member 46 can be referred to as a roof member. The eighth frame member 46 can extend from and be connected to each of the seventh frame member 44 and the ninth frame member 48.

The tenth frame member 50 can represent the bottom edge of a bumper fascia that extends along the rear end of the second vehicle V2. The tenth frame member 50 can be referred to as a bottom member. The tenth frame member 50 can extend from and be connected to each of the fourth frame member 38 and the ninth frame member 48.

The ninth frame member 48 can be connected to and extend from each of the eight frame member 46 and the tenth frame member 50. The ninth frame member 48 can be referred to as a support member.

Referring to FIGS. 3, 4, 6, 8 and 10 collectively, the fifth frame member 40, an eleventh frame member 52, a twelfth frame member 54, and a thirteenth frame member 56 can be connected to each other to frame the second planar area P3.

The eleventh frame member 52 can represent the portion of a rear pillar that extends along a rear window of the first vehicle V1 in the rear-view silhouette of the first vehicle V1. Alternatively, the eleventh frame member 52 can represent the portion of the front pillar in the front-view silhouette that extends along the front windshield of the second vehicle V2. The eleventh frame member 52 can be referred to as a pillar member.

The twelfth frame member 54 can represent an upper portion of a rear tailgate of the first vehicle V2 or a front windshield header of the second vehicle V2. The twelfth frame member 54 can be referred to as a roof member. The twelfth frame member 54 can extend from and be connected to each of the eleventh frame member 52 and the thirteenth frame member 56.

The fourteenth frame member 58 can represent the bottom edge of a bumper fascia that extends along the rear end of the first vehicle V2. The fourteenth frame member 54 can be referred to as a bottom member. The fourteenth frame member 58 can extend from and be connected to each of the fifth frame member 40 and the thirteenth frame member 56.

The thirteenth frame member 56 can be connected to and extend from each of the twelfth frame member 54 and the fourteenth frame member 58. The thirteenth frame member 56 can be referred to as a support member.

Referring to FIGS. 3-5, 7 and 9 collectively, the seventh frame member 44 and eleventh frame member 52 can border the fourth planar area P4. The fourth planar area P4 can be at an angle with respect to the first planar area P1 such that the fourth planar area P4 is inclined in the transverse direction T of the jig 12. The fourth planar area P4 can extend from the first planar area P1 to the seventh planar area P7. The fourth planar area P4 can represent the exterior surface portion of the vehicles V1, V2 that extends along the door glass.

Instead of filling the entire area of the first planar area P1 with inlets 16, water collection assemblies 14 can be omitted from the upper portion of the first planar area P1 that extends above the fourth and fifth frame members 38, 40. The water collected along the fourth planar area P4 can collect the water that sprayed toward this upper portion of the first planar area P1. The fourth planar area P4 is at an angle that more closely represents the door glass. Thus, the water collected by the inlets secured in the fourth planar area P4 can more accurately represent the water sprayed onto the door glass of the vehicles V1, V2 by the water leak tester 20.

Referring to FIGS. 3, 4, 6, 8 and 10 collectively, the seventh frame member 32 and a fifteenth frame member 60 can border the fourth planar area P5. The fifth planar area P5 can be at an angle with respect to the second planar area P2 such that the fifth planar area P5 is inclined in the longitudinal direction L of the jig 12. The fifth planar area P5 can extend from the second planar area P2 to the seventh planar area P7. The fifth planar area P5 can represent the exterior surface portion of the vehicles V1, V2 that extends along the front windshield of the vehicles V1, V2 or along an upper portion of a rear tailgate of the vehicles V1, V2.

Instead of filling the entire area of the second planar area P2 with inlets 16, water collection assemblies 14 can be omitted from the upper portion of the second planar area P2 that extends above the fourth frame member 38. The water collected along the fifth planar area P5 can collect the water that sprayed toward this upper portion of the second planar area P2. The fifth planar area P5 is at an angle that more closely represents an upper portion of the front or the rear of the vehicles V1, V2. Thus, the water collected by the inlets secured in the fifth planar area P5 can more accurately represent the water sprayed onto the front or the rear of the vehicles V1, V2 by the water leak tester 20.

Referring to FIGS. 3, 4, 6, 8 and 10 collectively, the third frame member 36 and a sixteenth frame member 62 can border the sixth planar area P6. The sixth planar area P6 can be at an angle with respect to the second planar area P2 such that the sixth planar area P6 is inclined in the longitudinal direction L of the jig 12. The sixth planar area P6 can extend from the third planar area P3 to the seventh planar area P7. The sixth planar area P6 can represent the exterior surface portion of the vehicles V1, V2 that extends along the front windshield of the vehicles V1, V2 or along an upper portion of a rear tailgate of the vehicles V1, V2.

Instead of filling the entire area of the third planar area P3 with inlets 16, water collection assemblies 14 can be omitted from the upper portion of the third planar area P3 that extends above the fifth frame member 40. The water collected along the sixth planar area P6 can collect the water that sprayed toward this upper portion of the third planar area P3. The sixth planar area P6 is at an angle that more closely represents an upper portion of the front or the rear of the vehicles V1, V2. Thus, the water collected by the inlets secured in the sixth planar area P6 can more accurately represent the water sprayed onto the front or the rear of the vehicles V1, V2 by the water leak tester 20.

Referring to FIGS. 3 and 4 collectively, a seventeenth frame member 64 and the second frame member 34 can border the seventh planar area P7. The seventh planar area can border the fourth, fifth and sixth planar areas P4, P5, P6. The fourth, fifth and sixth planar areas P4, P5, P6 can be at a respective angle with respect to the seventh planar area P7.

Referring to FIG. 3, the jig 12 can include a first intermediate frame member 66, a second intermediate frame member 68 and a third intermediate frame member 70. The intermediate frame members 66, 68 can be configured such that a water a funnel 28 can hang from the intermediate frame members 66, 68. Further, the intermediate frame members 66, 68 can be configured such that the funnel 28 is secured on top of the frame members 66, 68 in the vertical direction V of the jig 12.

The first intermediate frame member 66 can extend from the fourth frame member 38 to the fifth frame member 40. The first intermediate frame member 66 can extend along and in the first planar area P1.

The second intermediate frame member 68 can extend from the fourth frame member 38 to the ninth frame member 48. The second intermediate frame member 68 can extend along and in the second planar area P2.

The third intermediate frame member 70 can extend from the seventh frame member 44 to the eleventh frame member 52. The second intermediate frame member 70 can extend along and in the fourth planar area P4.

Referring to FIGS. 2 and 12, the vehicle surface simulation apparatus 10 can include a carriage 72 on which the jig 12 is supported. The carriage 72 can be configured as a lower frame structure. The jig 12 can be connected to the carriage 72 in any appropriate manner such as but not limited to mechanical fasteners, welds, adhesive or any combination thereof. The carriage 72 can include a plurality of caster wheels 74. The carriage 72 can facilitate moving the vehicle surface simulation apparatus 10 into and out of the water leak tester 20 and permit the vehicle surface simulation apparatus 10 to adapt to a water leak tester that includes a conveyor. The carriage 72 can be configured to be supported by a plurality floor jacks 76 when the water leak tester 20 is a static booth water leak tester as shown in FIGS. 13 and 14. The floor jacks 76 can permit height adjustments for the carriage 72 so that the vehicle surface simulation apparatus 10 can more accurately simulate the ride height for each of the plurality of different vehicles (such as but not limited to the first and second vehicle V1, V2) that are to be tested in the water leak tester 20.

While certain embodiments of the invention are described above, it should be understood that the invention can be embodied and configured in many different ways without departing from the spirit and scope of the invention.

For example, embodiments are disclosed above in the context of a vehicle surface simulation apparatus 10 that simulates only the portion of the vehicle exterior that encloses the cabin. However, alternate embodiment of the vehicle surface simulation apparatus 10 can simulate the entirety of the vehicle exterior, including the hood, front fenders, front grille, front bumper fascia, and/or front aerodynamic surfaces and inlets.

Embodiments are disclosed above in the context of a vehicle surface simulation apparatus 10 that simulates one longitudinal half of the vehicle cabin shown in FIGS. 4-9. However, alternate embodiments can include a jig 12 that simulates more or less of the vehicle cabin.

Embodiments of the vehicle surface simulation apparatus 10 disclosed above can omit one or more planar areas that represent the front portion of the vehicle, including the hood (also referred to as a bonnet) and front end surface(s) of the vehicles V1, V2. However, alternate embodiments can simulate the entire exterior surface of the vehicles V1, V2.

Alternate embodiments can include all of the desired water collection assemblies permanently fixed to the jig 12 in a predetermined pattern that represents the exterior surface profile of a specific vehicle.

Exemplary embodiments are also intended to cover execution of steps S102-S114 of the process of FIG. 11 in any order relative to one another. And, any of the steps S102-S114 can be omitted or combined, as desired.

What is claimed is:

1. A vehicle surface simulation apparatus for mapping a spray pattern of a plurality of water nozzles of a water leak tester configured to spray water onto an exterior of a vehicle during a water leak test, the vehicle surface simulation apparatus comprising:
   a jig having a longitudinal direction, a transverse direction and a vertical direction that are orthogonal to each other, the jig configured to simulate a plurality of exterior surface portions of a first vehicle and a plurality of exterior surface portions of a second vehicle that is different from the first vehicle, the jig including,
   at least one side area extending along the longitudinal direction, the side area is configured to represent at least a portion of a side-view profile of each of the first vehicle and the second vehicle, and
   at least a first end area extending along the transverse direction, the first end area is configured to represent at least a portion of a front-view profile of the first vehicle and at least a portion of a rear-view profile of the second vehicle;
   at least one funnel that includes an inlet and is removably supported in one of the areas such that the inlet lies in a plane that represents a predetermined surface of the vehicle;
   at least one container removably supported by the jig; and
   at least one conduit connected to and extending from the funnel to the container, and the conduit is in fluid communication with the funnel and the container,
   wherein the jig includes,
   a first longitudinal member bounds a portion of the side area, and
   a second longitudinal member connected to and extending from the first longitudinal member at an angle with respect to the first longitudinal member, the second longitudinal member bounds a portion of the side area and a portion of the first end area, and the second longitudinal member represents a front pillar of the first vehicle in the side-view profile of the first vehicle and a rear pillar of the second vehicle in the side-view profile of the second vehicle,
   wherein the jig includes a first transverse member connected to and extending from the second longitudinal member at a second angle, the first transverse member bounds a portion of the first end area, and the first transverse member represents the front pillar of the first vehicle in the front-view profile of the first vehicle and the rear pillar of the second vehicle in the rear-view profile of the second vehicle.

2. The vehicle surface simulation apparatus according to claim 1, wherein the jig includes,
   a third longitudinal member connected to and extending from the first longitudinal member at a second angle that is different from the first angle, and the third longitudinal member represents a rear pillar of the first vehicle in the side-view profile of the first vehicle or the front pillar of the second vehicle in the side-view profile of the second vehicle, and
   a second transverse member connected to and extending from the third longitudinal member at a third angle, the second transverse member bounds a portion of a second end area that is spaced away from the first end area, and the second transverse member represents the front pillar of the vehicle in the front-view profile and a rear pillar of the vehicle in the rear-view profile of the vehicle.

3. The vehicle surface simulation apparatus according to claim 1, wherein
   the jig includes a lower frame portion and a plurality of wheels mounted on the lower frame portion, and
   the container is supported by the jig above the lower frame portion.

4. The vehicle surface simulation apparatus according to claim 1, wherein the jig is asymmetrical in each of the longitudinal direction and the transverse direction.

5. The vehicle surface simulation apparatus according to claim 1, wherein the conduit includes a flexible hose such that the inlet is movable relative to the receptacle.

6. The vehicle surface simulation apparatus according to claim 1, wherein
   the jig further includes,
   first roof member extending along the longitudinal direction and having a first end and second end,
   a first pillar member connected to and extending from the first end of the first roof member at a first angle, and extending along the longitudinal direction,
   a second pillar member connected to and extending from the second end of the first roof member at a second angle that is different from the first angle, and extending along the longitudinal direction,
   a third pillar member connected to and extending from the first pillar member at a third angle, and extending from the first pillar along the vertical direction,
   a fourth pillar member connected to and extending from the second pillar member at a fourth angle, and extending from the first pillar along the vertical direction, and a first bottom member connected to and extending from the third pillar member and the fourth pillar member, and extending along the longitudinal direction, and an intermediate member connected to and extending from the third pillar member and the fourth pillar member, and extending along the longitudinal direction across and within the side area, and located between the first bottom member and the third and fourth pillars in the vertical direction, the first roof member, the first pillar member, the second pillar member, the third, pillar member, and the fourth pillar member enclosing the side area.

7. The vehicle surface simulation apparatus according to claim 6, wherein the jig further includes, a fifth pillar member connected to and extending from the first pillar member at a fifth angle, and extending along a transverse direction of the frame assembly, a second roof member connected to and extending from the third pillar member along the transverse direction of the frame assembly, and bounding the first end area, a first support member connected to and extending from the second roof member along the vertical direction, a second bottom member connected to and extending from the fourth pillar member and the first support member along the transverse direction, and a second intermediate member connected to and extending from the third pillar and the first support member in the transverse direction at a location that is between the second bottom member and the second roof member In the vertical direction, the second intermediate member extends across the first end area, and the third pillar member, the fifth pillar member, the second roof member, the first support member, and the second bottom member enclose the first end area.

8. A vehicle surface simulation kit for determining spray patterns for a water leak tester, comprising:

a frame assembly including a plurality of adjustable collection locations spaced along the frame assembly; and a plurality of water collection assemblies, each of the water collection assemblies includes an inlet and a receptacle in fluid communication with the inlet, and each of the water collection assemblies is configured to be selectively secured to any of the adjustable collection locations such that each of the inlets lies in a plane that represents a corresponding surface area of the vehicle, wherein the frame assembly includes a first set of frame members that define a first planar end area and a second set of frame members that define a second planar end area that is at an angle with respect to the first planar end area, the first set of frame members is configured to represent a first surface area that is located at a front portion or a rear portion of the vehicle, and the second set of frame members is configured to represent a second surface area that is located at the front portion or the rear portion of the vehicle, a respective one of the water collection assemblies is configured to be selectively secured in either of the first set of frame members or the second set of frame members.

9. The vehicle surface simulation kit according to claim 8, wherein each of the water collection assemblies includes, a funnel including the inlet, and a flexible hose connected to and extending from the funnel to the receptacle, and the flexible hose is in fluid communication with the inlet and the receptacle.

10. The vehicle surface simulation kit according to claim 8, wherein the frame assembly includes a lower frame portion and a plurality of wheels mounted on the lower frame portion, and the receptacle is supported by the frame assembly above the lower frame portion.

11. A vehicle surface simulation kit for determining spray patterns for a water leak tester, comprising:

a frame assembly including a plurality of adjustable collection locations spaced along the frame assembly; and a plurality of water collection assemblies, each of the water collection assemblies includes an inlet and a receptacle in fluid communication with the inlet, and each of the water collection assemblies is configured to be selectively secured to any of the adjustable collection locations such that each of the inlets lies in a plane that represents a corresponding surface area of the vehicle, wherein the frame assembly includes a first side set of frame members that define a first planar side area and a second side set of frame members that define a second planar side area that is at an angle with respect to the first planar side area, the first side set of frame members is configured to represent a first surface area that is located at a side portion of the vehicle, and the second side set of frame members is configured to represent a second surface area that is located at the side portion of the vehicle, and each of the water collection assemblies is configured to be selectively secured in either the first side set of frame members or the second side set of frame members.

\* \* \* \* \*